United States Patent
Katsumori

[15] 3,647,239
[45] Mar. 7, 1972

[54] VEHICLE SUSPENSION MECHANISM
[72] Inventor: Teiji Katsumori, Yokohama, Japan
[73] Assignee: Tokico Limited, Kanagawa-ken, Japan
[22] Filed: July 15, 1970
[21] Appl. No.: 54,947

[30] Foreign Application Priority Data

| July 17, 1969 | Japan | 44/56683 |
| July 17, 1969 | Japan | 44/56684 |
| July 25, 1969 | Japan | 44/59241 |
| July 25, 1969 | Japan | 44/59242 |

[52] U.S. Cl. ........................................280/124 F, 207/64 R
[51] Int. Cl. .....................................................B60g 11/26
[58] Field of Search ...............267/21, 64 R, 64 A; 280/124 F

[56] References Cited

UNITED STATES PATENTS

| 3,399,882 | 9/1968 | Hausmann | 267/64 A |
| 3,168,302 | 2/1965 | Burris | 267/64 |

*Primary Examiner*—Philip Goodman
*Attorney*—Sughrue, Rothwell, Mion, Zinn & Macpeak

[57] ABSTRACT

The suspension strut of the monotube-type for use with a powered and wheeled vehicle is of the combined hydraulic and pneumatic type having a cylinder and a piston slidable therein and the interior space of said cylinder is filled with a hydraulic liquid such as oil. The piston is fitted with flow-restricting valve means for generating damping forces during telescopic relative movement of said piston to said cylinder and said piston is mechanically connected with the chassis or running gear of said vehicle which said cylinder is fixed to the other portion of the vehicle. The improvement comprises a sleeve formed between said rod and said piston and a free piston is slidably mounted within the interior space of said sleeve for dividing said space into two variable volume chambers and a certain volume of a high-pressure inert gaseous medium is confined within one of said two chambers in a totally enclosed manner by rigid encircling walls for assuring the least possible leakage of the confined gaseous medium from said gas chamber.

4 Claims, 8 Drawing Figures

PATENTED MAR 7 1972

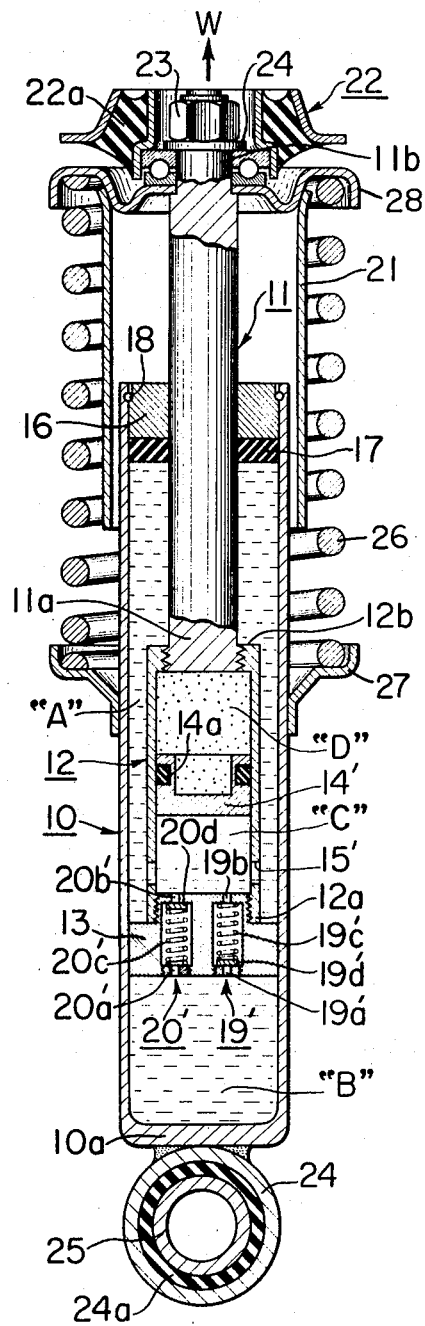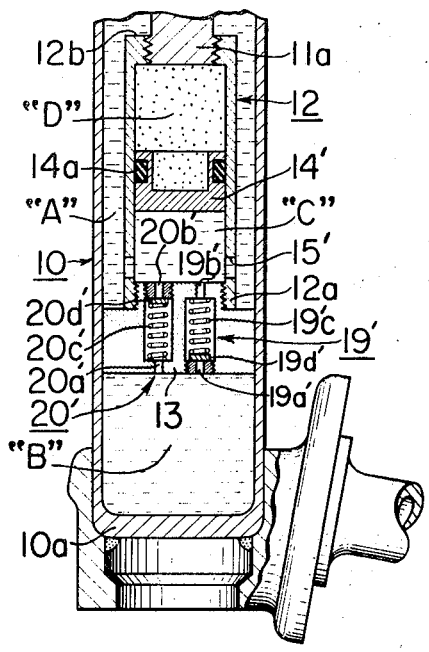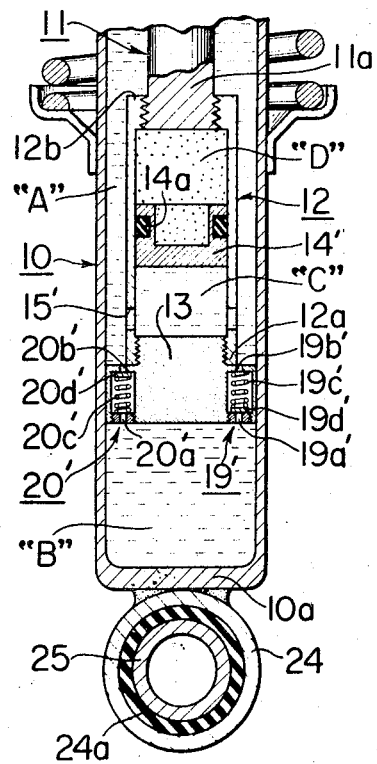
FIG. 4
FIG. 5
FIG. 6

VEHICLE SUSPENSION MECHANISM

This invention relates to improvements in and relating to a suspension mechanism for use with a powered vehicle, preferably an automotive vehicle of the telescopic type capable of expanding and contracting for supporting the vehicle load and of absorbing shocks as met during travelling of the vehicle.

It is an object of the invention to provide a suspension strut for the powered vehicle substantially obviating or lessening the duty of the conventionally used mechanical suspension spring. Even when a mechanical spring is used for the safety and/or auxiliary measure, the performance thereof can be considerably lighter than the conventionally used one.

A further object is to provide a suspension strut of the kind above referred to and of the combined pneumatic and hydraulic type, wherein a certain volume of high pressure cushioning gas is confined in a pressure gas chamber totally insulated mechanically from the working liquid medium and movable in unison with the telescopically movable member, thereby insulated from ambient atmosphere through a double-walled insulating means for providing a substantial difficulty of unintentional leakage of the confined cushioning gas.

A still further object of the invention is to provide a suspension strut of the kind above referred to, capable of providing a substantial resistance against the disadvantageous effect of lateral bending moments.

These and further objects, features and advantages of the invention will become more apparent when read the following detailed description of several preferred embodiments of the invention by reference to the accompanying drawings.

In the drawings:

FIG. 4 is a similar view to FIG. 1, showing a fourth embodiment of the invention.

FIG. 5 is a sectional view of a fifth embodiment of the invention.

FIGS. 6 and 7 are similar views to FIG. 2, showing a sixth and a seventh embodiment of the invention, respectively.

Figure 1:
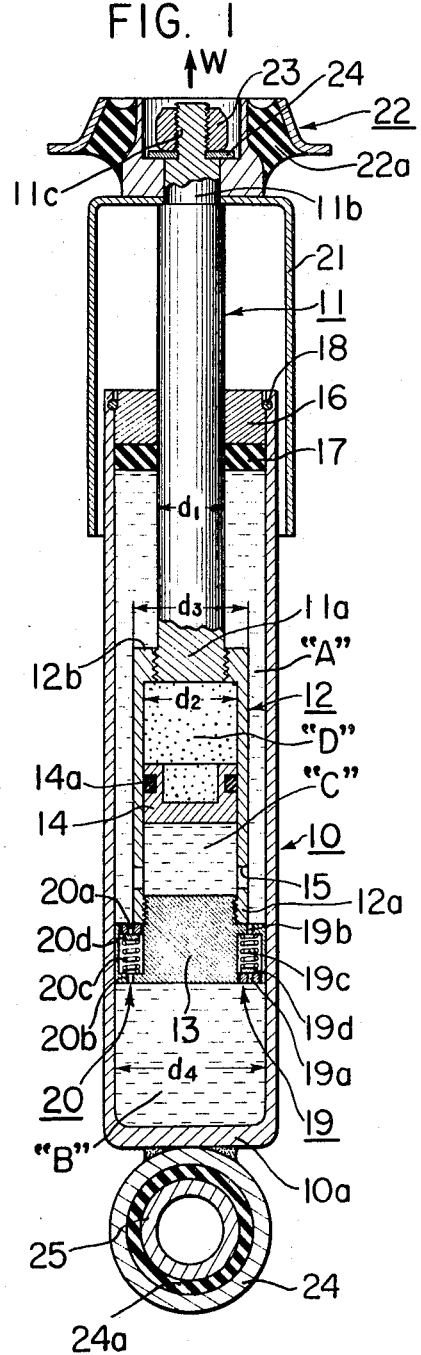
FIG. 1 is substantially longitudinal section of a first embodiment of the invention.

Referring now to the accompanying drawings, especially FIG. 1 thereof, the first embodiment of the invention will be described in detail.

In this Figure, the numeral 10 represents a hollow cylinder member, the lower bottom 10a of which is closed as shown, the interior space of said cylinder being filled with a working liquid medium, preferably oil.

A piston rod 11 fitted at its lower end 11a rigidly with a hollow sleeve 12 by means of conventional fixing means such as screwing, welding, fusing or the like. A piston 13 is fixedly attached to the lower end 12a of said sleeve 12 again by means of conventional fixing means such as screwing, welding, fusing or the like and slidably mounted within the interior space of the said cylinder 10. For this purpose, one or more conventional sealing means are provided, although not shown. A sample of this sealing means is seen from FIG. 3. By the provision of said piston 13, the interior space of the cylinder 10 is divided into two hydraulic chambers "A" and "B."

The interior space of the sleeve 12 is divided into two chambers "C" and "D" by the provision of a slidable free piston 14 having a sealing means 14a. The upper closed chamber "D" contains a predetermined quantity of gaseous pressure medium such as air or other inert gas, preferably nitrogen, while the lower chamber "C" is kept in communication through a plurality or radial communication openings commonly represented by a single reference numeral 15, with the upper hydraulic chamber "A" formed in the cylinder 10 referred to above.

The upper end of the cylinder 10 is closed by a rod guide 16 and a sealing member 17 arranged in a stack as shown, said rod 11 passes slidably through this stack. A spring clip 18 is provided for positioning the rod guide 16 at the upper end portion of the cylinder 10.

As shown, the diameter $d_1$ of rod 11 is smaller than the diameter $d_2$ of the gas chamber "D," and the outside diameter $d_3$ of sleeve 12 is smaller than the diameter $d_4$ of the piston 13 or the inside diameter of the cylinder 10. This feature is embodied in all other embodiments to be described, although it is not always illustrated in the drawings only for simplicity. By the provision of the communication openings 15, the lower chamber "C" in the sleeve 12 is also filled with oil. The pressure of the confined gas in the chamber "D" amounts in the mean to as high as 40 kg. per square centimeter, as an example, so that the oil prevailing in the hydraulic chambers "A," "B" and "C" is always kept under pressure.

Check valve means 19 which may be plural although not specifically shown, is provided in the body of the piston 13 for checking oil flow from chamber "A" to "B" and allowing the reverse flow only in a limited way, as is commonly known in the conventional comparative kind of suspension mechanism. For this purpose, the check valve means 19 comprises reducing passages 19a and 19b, valve spring 19c and valve disc 19d.

Similar check valve means 20 which may also be in plural is provided in the body of the same piston 13 checking oil flow in the reverse sense from chamber "B" to "A" and limiting reversed flow from chamber "A" to "B." This valve means 20 comprises reducing passages 20a and 20b, valve spring 20c and valve disc 20d.

When necessary, these check valve means 19 and 20 may be replaced by flow reducing orifices.

As may be seen, the sealing ring 17 establishes an effective seal for the hydraulic liquid contained in the liquid contained in the liquid chamber "A" against the ambient atmosphere.

The positively positioned stack 16–17 serves for limiting the maximum allowable stroke of the piston 13 by contacting the upper end 12b of the sleeve 12 when the suspension strut expands. The sealingly and slidably projecting portion of the rod 11 through the stack 16–17 has a slightly reduced end part 11b to which an inverted cup-shaped dust-proof cover member 21 is fixedly attached. Numeral 22 represents an attachment which is fixedly to the top further reduced and screwed end 11c of rod 11 by means of a nut 23 through a washer 24. Although not shown, the attachment 22 is provided with an elastic cushioning member 22a and fixedly attached to the chassis of the vehicle. There is provided a further attachment 24 fixed to the lower end 10a of cylinder 10 by welding or the like conventional fixing procedure, said attachment comprises a cushioning member 24 and being attached to a certain mounting member 25 which is fixedly mounted on the axle housing, not shown, of the vehicle.

The operation of the first embodiment so far shown and described is as follows:

It will be easily understood that the high pressure owned by the confined gaseous medium in the chamber "D" will provide to the piston-and-rod assembly 11–13 always with an upwardly directing urging force symbolizingly represented by a small arrow attached with a symbol "W." This urging force "W" may be expressed by the following formula (1).

$$W = \frac{\pi}{4} d_2^2 \cdot P \qquad (1)$$

when assuming that $P$ represents the gas pressure in the chamber "D." This force "W" acts naturally in the expanding direction of the mechanism. The gas pressure and the dimensions of the main constituents are so selected that under the statically loaded conditions as met with the vehicle maintained in its stopped position, the piston 13 will occupy substantially a midpoint along the whole length of the cylinder 10, corresponding to the neutral position of the mechanism, thereby supporting the attributed load of the vehicle chassis with occasionally additional vehicle loads.

When it is assumed that the gas pressure at this neutral stage is denoted by $P1$ and the expandingly urging force called the initial load is represented by $W1$ and further that the gas pressure and volume at the maximally extended state of the suspension strut is denoted by $Po$ and $Vo$, respectively, and the deflection (expressed in terms of the piston stroke) measured from the maximally extended position to the neutral position is expressed by $S1$, the following relationship will be established:

$$P1 = \frac{Vo}{V_o - \frac{\pi}{4} d2^2 \cdot S1} \cdot Po \quad (2)$$

$$W1 = \frac{\pi}{4} d2^2 \cdot P1 \quad (3)$$

This axially acting urging force $W1$ will support the statical loads coming from the chassis side of the vehicle when the latter is maintained in its stopped condition.

When the vehicle is subjected to vibrations during travel thereof and the suspension strut is contracted, the piston 13 will lower from its neutral position within the interior space of cylinder 10, while the remaining check valve means 20 is kept in its flow-checking position, thus the hydraulic liquid prevailing in the lower most cylinder chamber "B" being subjected to a sudden and substantial compression and escaping therefrom through check valve means 19 into the now expanding liquid chamber "A." In this case, the check valve means 19 acts as a kind of damping force generator, by providing a substantial resistance to the flowing oil therethrough. In this way, the vibration energy is subjected to a damping action, as is commonly known to those skilled in the art. At this stage, an excess oil quantity corresponding to the increased volume of the rod displacement will invade from the chamber "A" through communication openings 15 into the chamber "C," thereby the free piston 14 being moved forcibly upwards and the effective volume of the gas chamber "D" being subjected to a corresponding reduction accompanying a corresponding increase of the gas pressure contained therein.

When, on the contrary, the suspension strut is subjected to a return or contraction, it will be clear from the foregoing that the gas pressure is reduced correspondingly.

In this case, the remaining check valve means 20 acts as the damping force generator, while the valve means 19 will act as the check valve per se. Thus, the vibration energy will be subjected also to a damping action.

When it is assumed that the contracting deflection as measured from the neutral position to the contracted one of the whole mechanism is represented by $S2$ and the thus reduced gas pressure by $P2$, the load suspension force $W2$ may be expressed as follows:

$$P2 = \frac{Vo}{Vo - \frac{\pi}{4} d2^2 (S1+S2)} \cdot Po \quad (4)$$

$$W2 = \frac{\pi}{4} \cdot d2^2 \cdot P2 \quad (5)$$

When the deflection appearing in the expanding stroke of the piston-rod assembly is expressed by $S3$, the load-bearing force in this case will be:

$$P3 = \frac{Vo}{Vo - \frac{\pi}{4} d2^2 \cdot (S1-S3)} \cdot Po \quad (6)$$

$$W3 = \frac{\pi}{4} d2^2 \cdot P3$$

where, $P3$ denotes the reduced gas pressure.

Figure 2:
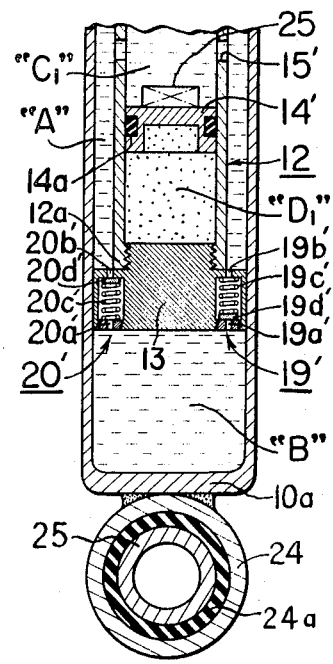
FIG. 2 is an essential part of a longitudinal section of a second embodiment of the invention.

In the second embodiment shown in FIG. 2, the main difference from the foregoing embodiment resides in that the upper chamber $C1$ formed within the interior space of sleeve 12 constitutes a liquid chamber in resemblance in its function to that shown in FIG. 1 at "C," while the lower chamber $D1$ serves as the pressure gas chamber in resemblance in its function to that denoted at "D" in FIG. 1. A next difference is of minor nature which comprises the specific configuration of the floating piston 14' acting as the separator for the pressurized gas contained in the chamber $D1$ from the liquid prevailing in the chamber $C1$. Thus, as shown, the floating piston is shaped into an inverted cup as contrast to the foregoing piston 14. In addition, check valve means 19' and 20' are somewhat modified from the foregoing in their detail structure as shown.

A stopper member 25 is fixedly mounted on the upper surface of the floating piston 14' for limiting the upward stroke thereof by occasional contract with the lower end of the rod, not shown.

The function and effects of the present embodiment are substantially similar to those set forth in the foregoing.

Lateral communication openings 15' are provided through the wall of said sleeve 12 at a substantially higher level than before, for fluidically connecting the chambers "A" and $C1$.

Figure 3:
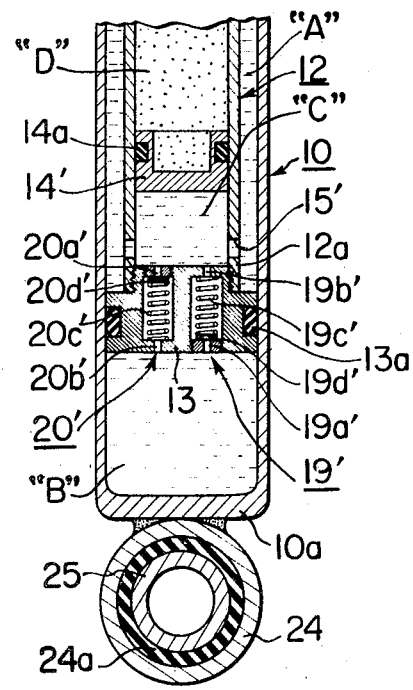
FIG. 3 is a similar view to FIG. 2, showing essential parts of a third embodiment.
Figure 7:
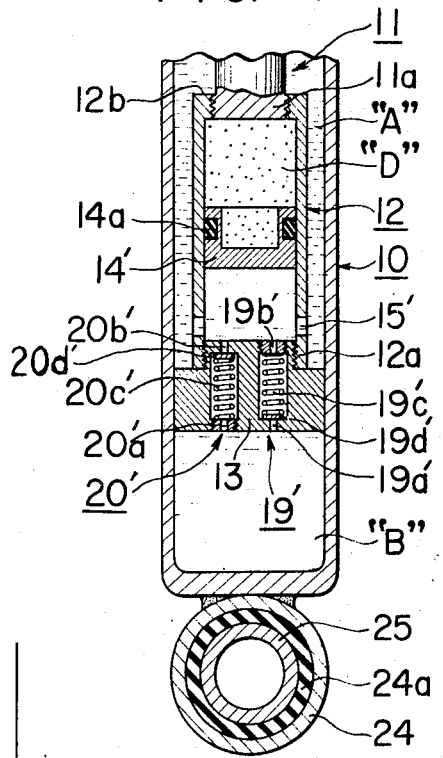

In the third embodiment shown in FIG. 3, the main difference resides in that the check valve means 19' and 20' are provided in the body of said piston 13, so as to fluidically connecting both chambers "B" and "C," instead of between "A" and "B" in the foregoing. Therefore, the structure and function of the present embodiment are substantially similar to those of the foregoing embodiments.

In the fourth embodiment shown in FIG. 4, the substantial construction and features are similar to those of the combined arrangement of those shown in FIGS. 1 and 3, as will be clearly seen by consultation with the reference numerals shown in this FIG. 4.

The main difference of the present embodiment from the foregoing several embodiments resides in the provision of an auxiliary suspension spring 26. The cylinder 10 is provided with a mounting flange 27 fixedly attached by welding or the like conventional fixing means to the outer periphery of the cylinder at an intermediate position between the both extremities thereof, for abutting the lower end of said auxiliary spring, while the upper end of the same spring abuts under pressure upon a mounting cap 28 fixedly attached to the upper end of dust-proof cover 21', said cap being fixedly attached to the top-end portion of said rod 11.

Figure 8:
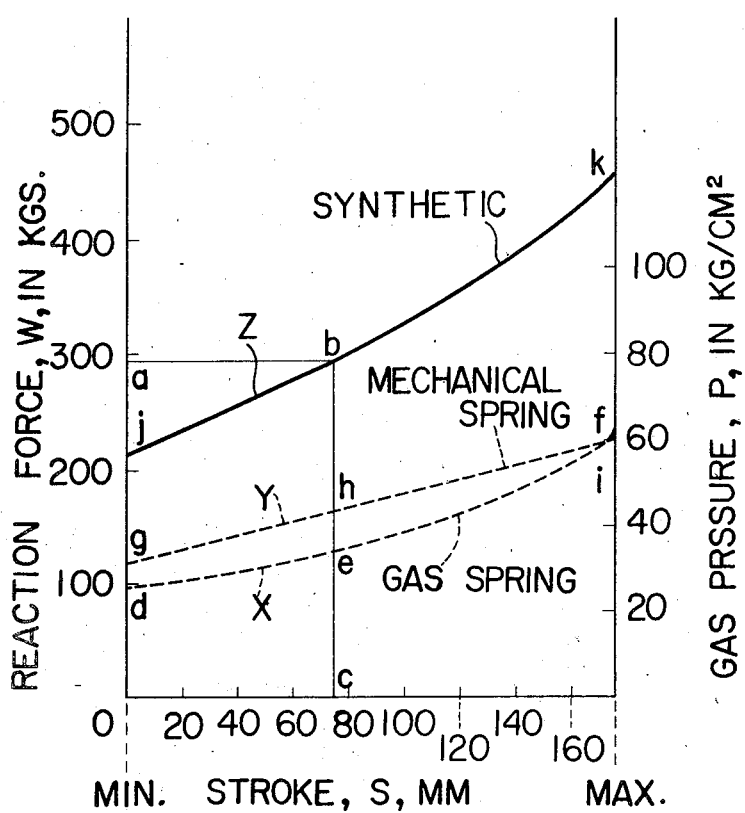
FIG. 8 is a characteristic curve of the mechanism according to the invention, when the mechanism is fitted with an auxiliary suspension spring as in the case of the fourth or sixth embodiment.

The operation of the fourth embodiment will be described hereinunder by reference to FIG. 8, showing a combined chart, illustrating several performance curves.

In this chart, the reaction force or more specifically the load-bearing force, $W$, and the gas pressure, $P$, are plotted against the piston stroke, $S$. The curve X extending from $d$ through $e$ to $f$ is that for the gas spring alone. The next curve Y extending from $g$ through $h$ to $i$ is that for the mechanical spring 26 only.

The third curve Z extending from $j$ through $b$ to $k$ is a synthetic curve obtained by the addition the foregoing two curves X and Y. This curve Z corresponds to the desired load-bearing one.

The thin solid line $a$-$b$-$c$ represents the neutral position of the strut; the points $e$ and $h$ correspond to the neutral points.

As seen, the gas pressure force amount to about 130 kg., while the mechanical spring will provide a force of about 165 kg., the synthetic force of the both amounting to about 295 kg. The corresponding gas pressure amounts to 35 kg./cm$^2$.

By the employment of the combined pneumatic and hydraulic suspension strut as shown in FIG. 4 added with the auxiliary mechanical spring, the strength of the latter can be selected to a substantially low value, as was described hereinabove, thanks to the possibility of employment of a high-pressure gas confined in the innermost part of the interior space of the cylinder 10.

It will be clear from the foregoing that this possibility of employment of the high-pressure gas is applicable to all other embodiments of the embodiments shown and described in the foregoing and to be shown and described in the foregoing.

Several other embodiments shown in FIGS. 5-6 will become apparent when read the foregoing description by consulting with these drawings without further analysis. The feature of the addition of the auxiliary spring may naturally be employed to all the remaining embodiments.

What we claim is:

1. In a suspension strut of the telescopic type for use with a vehicle having a chassis and a running gear, said strut being of the combined hydraulic and pneumatic type having a cylinder and a piston slidable therein, the interior space of said cylinder being filled with a hydraulic liquid such as oil and said piston being fitted with flow-restricting valve means for generation of damping forces during telescopic movement of said piston relative to said cylinder, said piston being mechanically connected through a connecting rod with a selected one of said chassis and running gear and said cylinder being fixed to the remaining one of said chassis and running gear, the improvement comprises a sleeve formed between said rod and said piston, a free piston slidably mounted within the interior space of said sleeve for dividing said space into two variable volume chambers and a certain volume of a high pressure inert gaseous medium is confined within one of said two chambers in a totally enclosed manner by rigid encircling walls for assuring the least possible leakage of the confined gaseous medium from said gas chamber.

2. The suspension strut as claimed in claim 1, further comprising a mounting flange fixedly mounted on the outer periphery of said cylinder; a mounting cap fixedly attached to the upper end of a dust-proof cover, said mounting cap and said dust-proof cover being attached to said piston rod, a compression spring abutting by its both ends against said mounting flange and said mounting cap for urging said cylinder and said piston rod to move in relatively opposite axial directions.

3. The suspension strut as claimed in claim 1, further comprising an axle spindle attached to the lower part of said cylinder for supporting a vehicle wheel.

4. The suspension strut as claimed in claim 1, wherein said flow-restricting valve means communicate the variable volume chamber within the interior space of said sleeve on the side of said free piston opposite the chamber containing said high pressure inert gaseous medium with the interior space of said cylinder on the side of said piston opposite said sleeve.

* * * * *